July 24, 1951 — W. SENFT — 2,562,132
AUTOMATIC ARC WELDING WITH COATED ELECTRODES
Filed July 21, 1947 — 2 Sheets-Sheet 1
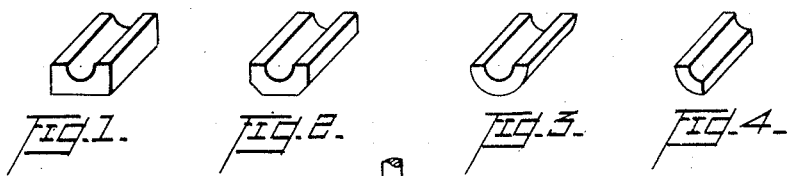
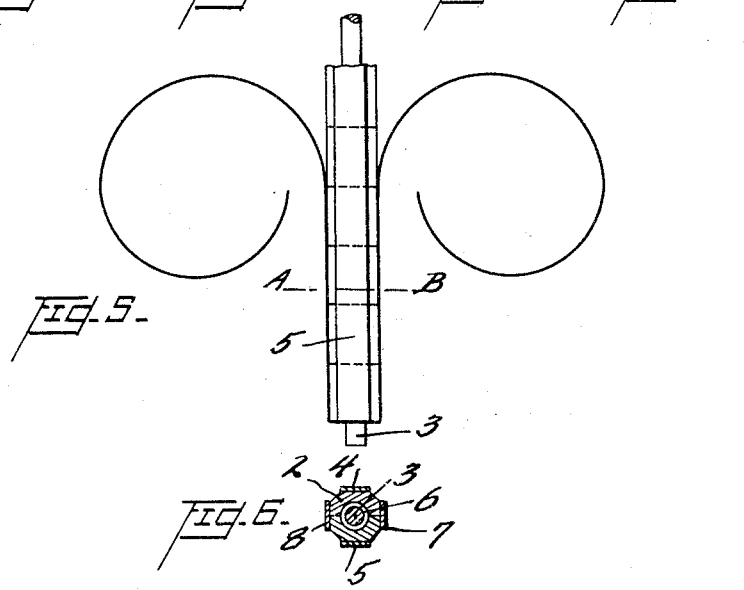
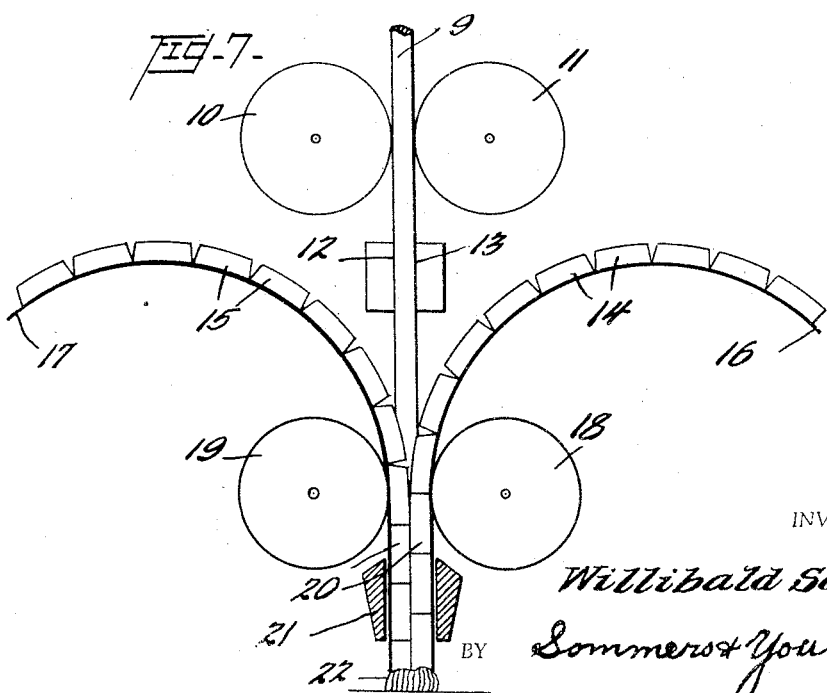
INVENTOR
Willibald Senft,
BY Sommers & Young
ATTORNEYS July 24, 1951 W. SENFT 2,562,132
AUTOMATIC ARC WELDING WITH COATED ELECTRODES
Filed July 21, 1947 2 Sheets-Sheet 2
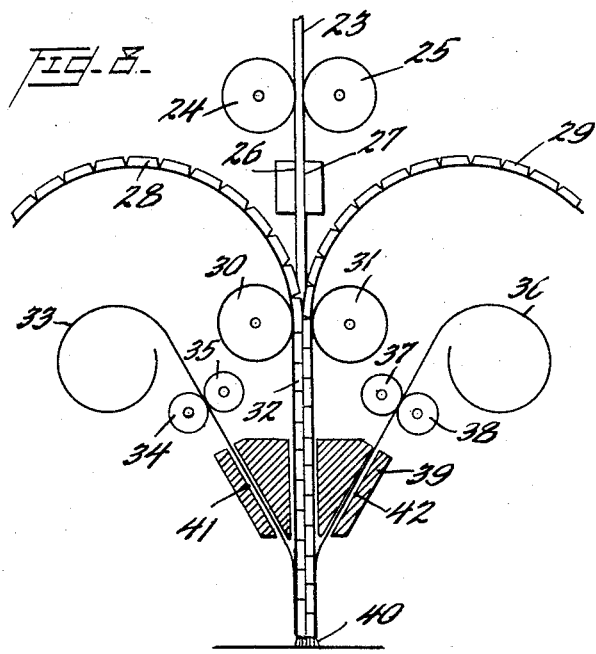
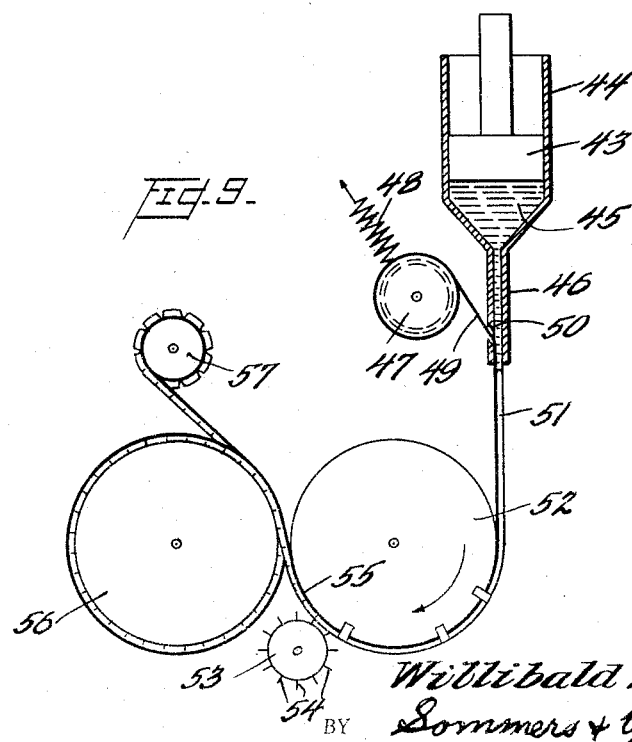
INVENTOR
Willibald Senft,
BY Sommers & Young
ATTORNEYS Patented July 24, 1951

2,562,132

UNITED STATES PATENT OFFICE 2,562,132

AUTOMATIC ARC WELDING WITH COATED ELECTRODES

Willibald Senft, Weiz, near Graz, Austria, assignor to Elin Aktiengesellschaft für elektrische Industrie, Vienna, Austria, a joint-stock corporation of Austria Application July 21, 1947, Serial No. 762,407
In Austria June 27, 1946

Section 1, Public Law 690, August 8, 1946
Patent expires June 27, 1966

13 Claims. (Cl. 219—8)

There have been invented and developed up to now many devices intended for fully automatic arc welding by means of coated electrodes, but they are, on the whole, of a complicated construction and, being thus readily exposed to damages during operation, they have not at all acquired in the market the importance they would deserve owing to savings in labor and cost, were these drawbacks not prevailing. As a matter of fact only semi-automatic devices have kept their ground in the market, but their advantage over hand welding is not very great.

The fully automatic operating devices developed up to now for welding with fully coated electrodes either use a flexible coated electrode of great length which, during operation of the device, commonly is fed from a bobbin supporting it, or they use coated bars of usual length in such a way that the burning bar is elongated at the rear end, at a predetermined state of consumption, by automatically feeding, coaxially with the fusing bar, the next bar and joining both bars together by screwing or welding or in a similar manner so as to obtain a rigid unit and provide an uninterrupted axial path for the welding current. Both the devices with coiled flexible electrodes and those with weld rods have the drawback that uncovered spots must be provided on the electrode at predetermined places, e. g. by milling, to provide for the supply of the welding current to the electrode core at a point comparatively near the arc.

The complicated mechanism needed for the before-mentioned operations requires considerable space and can be accommodated in the weld head only with difficulty.

Another method of fully automatic arc welding consists in supplying to the weld head a blank electrode and providing it, below the spot where the welding current is caused to enter it through rollers, sliding jaws or other means, with a coating by pressing upon it a plastic material so that the electrode is fed to the arc in a fully coated state. The apparatus required for obtaining an exact and faultless coating is however disproportionately large and renders the weld head still more bulky than with the other methods referred to above. Moreover it is impossible to cause the commonly used coating materials to keep sufficiently long the necessary uniformly plastic state.

There has also been designed another fully automatic method of arc welding with electrodes coated in the weld head which consists in feeding from bobbins continuous lengths of strips having such arcuate cross-section that two or more strips disposed alongside will encompass the electrode core and consisting of essentially non-deformable coating material. Since the coating material is brittle breakage of the strips is to be avoided by reeling the strips from bobbins of large diameter and by feeding the strips to the electrode core at as small an angle as possible. In spite of these precautionary measures which render the weld head rather bulky, the strips are supplied adhering to a fabric outer coating so that a strip broken into pieces will still be held together by the fabric.

One chief consideration in automatic arc welding with coated electrodes is to reduce the length of the welding-current path along the electrode core to a minimum as in this way there can be applied stronger currents which give better welds and allow of greater welding speeds. The enveloping process should thus be accommodated within as short a space as possible left between the current contact and the arc, which requires in turn increased bending of the covering material during enveloping and is, however, impeded by its insufficient flexibility. Moreover, it has not previously been possible to use the material best suited for the specific welding process but only materials which have had imparted some flexibility.

The invention forming the subject matter of my present application obviates all these drawbacks by using blank weld wire and applying to it, below the spot where the welding current is supplied to it, the covering material not in a plastic state but in the form of ready-shaped separate rigid pieces flexibly connected. These pieces have preferably a cross-section which is identical with a predetermined part, advantageously with one of two symmetrical halves, of the complete electrode covering. The shaped pieces are fed out of a magazine to the wire one after the other so that an uninterrupted line is formed by them, with their recessed faces which have to come in front of the weld wire forming an uninterrupted groove. Since such a row of shaped pieces, owing to their cross-section, covers only a certain part of the electrode circumference, an additional row or additional rows of covering pieces are fed, preferably out of separate magazines, to those parts of the weld wire which would remain uncovered, and in such a manner that all the rows together form the complete covering of the electrode wire. Preferably there is fed only one additional row which is symmetrical with respect to the first-mentioned row, each of both rows representing in lengthwise direction of the electrode one half of the complete covering.

The covering pieces are preferably connected with each other by attaching them to a common base serving as a flexible guiding or carrying member, e. g. tape, string, or wire, and they thus form a kind of covering chain. The tape may consist of incombustible material, e. g. asbestos, or glass-silk. The attaching may be done by pasting the pieces on the guiding member, e. g. with water-glass, or in another mechanical manner, e. g. by means of wire clamps which, while shaping the pieces in a separate device similar to that described below, are pressed into them.

The shaped pieces can be produced outside the weld head, advantageously in an apparatus completely separated from the automatic welding device, e. g. by casting, pressing, or punching, in the required dimensions or by forming sticks of greater length which, in a further step of production, are divided, e. g. by cutting, sawing or breaking, into pieces of the desired dimensions.

According to a further development of my invention, the row of covering pieces is manufactured by pressing the covering material, while in a plastic state, through an extrusion nozzle having the cross-section of the pieces to be shaped. A tape is simultaneously drawn through the nozzle along that side which is opposite the grooved side and at the same speed at which the covering material passes, so that the tape and the material leave the nozzle thoroughly combined and safely adhering to each other. Incisions are made before drying into that covering material face which is opposite the guiding tape at intervals corresponding with the desired length of the shaped pieces. These incisions give a row of abutting covering pieces, arranged in unmutable order on the common tape which will be wound upon a bobbin for use in the weld head.

The grooved faces of the covering pieces are so shaped that, when their several rows are assembled around the blank wire, the grooves are joined to form a hollow space which encloses the wire completely. The cross-sectional area of the hollow space may be identical with the cross-sectional area of the blank wire, so that the wire is in contact all over its circumference with the covering material. In this development of my invention the shaped pieces may be fastened to the wire itself, e. g. by pasting them on it or by clamping them on it. Then the wire and covering are necessarily fed to the arc at the same speed and the thickness of the shaped pieces is then predetermined because the quantity of the covering material fed to the arc must agree with the needs of the particular wire.

In a further development of my invention, the cross-sectional area of the hollow space formed by the assembled shaped pieces may be greater than the cross-sectional area of the wire and preferably may be so dimensioned that the wire can move freely within the hollow space. The covering pieces may in this case be thicker or thinner than would be required if the covering were in contact all over the circumference of the wire and fastened to it. Important advantages are obtained with a covering that, by means of a separate adjustable feeding mechanism, can be moved independently of the feeding speed of the wire. The quantity of covering material fed and thus the amount of slag produced can then be varied according to the special needs, also during the welding process. Furthermore, weld wires of different diameter can be used without having to take shaped pieces of other dimensions. The feeding rate of the covering may be adjusted so as to depend on the welding arc or also to be quite independent of the same.

The rows of covering pieces which are not fastened to the weld wire itself may be united, according to my invention, with one another to a rigid coating fully enclosing the wire by some binding means, e. g. clamps or, preferably, by pasting an adhesive tape or strip over the outside longitudinal joints of the rows of covering pieces.

According to a further development of my invention the several rows of covering pieces, instead of uniting them to a rigid coating either by fixing them to the wire and/or fastening them to each other by a binding means, may be firmly held together in the assembled state, to the very moment of fusing down in the arc, by means of spring pressure exerted from outside against the rows toward the wire so that the spring forces will, in total, substantially balance one another. This is achieved e. g. by resilient wires, e. g. steel wires, preferably flat wires. Since the spring wires, though outside the covering, are affected by the burning arc and eventually fuse down, they are continuously fed toward the arc, e. g. from a coil. The rate at which the spring wires are fed, preferably is independent of the feeding rate of the covering and may advantageously be much smaller than the latter, amounting only to a fraction thereof. Each spring wire is fed from its coil in a plane common to the weld wire axis and the axis of the row upon which it will press, and approaches its row obliquely. On meeting it the spring wire is deflected and presses its row tightly toward the weld wire axis until the coating fuses down in the arc.

My invention and several embodiments of the same are hereafter more particularly described with reference to the drawings:

Figs. 1 to 4 show different types of the rigid covering pieces, Fig. 5 is an elevation and Fig. 6 is a cross-section along line AB of Fig. 5, respectively, of the assembled covered electrode. Fig. 7 is a diagrammatic view of those parts of the automatic welding device which are the subject matter of my invention or are essential to explain its mode of operation. Fig. 8 is a similar view of a preferred embodiment of my invention. Fig. 9 illustrates a preferred embodiment of a device for producing a row of shaped covering pieces.

Figs. 1 to 4 show that the covering pieces may be shaped so that, when assembled to complete the covering, the cross-section of the latter is either rectangular, or polygonal, or circular, just as may be suitable e. g. for producing, connecting, guiding and assembling purposes. Fig. 4 shows a covering piece in a type of which more than two rows are necessary for assembling them to form a complete covering.

In Figs. 5 and 6, the shaped pieces 1 and 2, each representing a symmetrical half of the complete covering, are shown assembled around the blank electrode 3 and connected with the other pieces of the same row by means of the tapes 4 and 5. The electrode 3 has, in the illustrated embodiment, a smaller diameter than the hollow space left by the covering pieces 1 and 2, so that there is an interstice 6 between the inner walls of the pieces 1 and 2 and the surface of the electrode 3, allowing for different feeding rates of core and covering. Since the pieces 1 and 2 are not pasted on or otherwise attached to the electrode 3, they are united to a rigid covering body by applying to them at the sides where the guiding tapes 4 and 5 do not hold in their rows the pieces 2 and 1, respectively, adhesive tapes 7 and 8 from supports and by means of feeding devices not shown in the drawing.

Fig. 7 shows that the blank electrode 9 which, being of great length, may be fed in known manner from a bobbin, is driven by the rollers 10 and 11 and slides past the contact surfaces 12 and 13 which supply the welding current. Two rows 14 and 15 of covering pieces attached to tapes 16 and 17, respectively, are fed by driving rollers 18 and 19, respectively, from supports and along carriers not illustrated, and are assembled by these rollers so as to form a complete covering 20 for the electrode 9. The electrode 9 and the covering 20 are then fed through the guide nozzle 21 to the arc 22.

In the embodiment shown in Fig. 8, the blank electrode 23 is driven by the rollers 24 and 25 to slide past the contact surfaces 26 and 27 which supply the welding current, and to pass through the guide nozzle 39 to the arc 40. The rows 28 and 29 of the covering pieces are driven by the rollers 30 and 31, respectively, and assembled by these rollers to a complete covering 32 which has sufficient hollow space inside to allow for free movement of the electrode 23 with respect to the covering 32. Steel wires 33 and 36 are fed by driving rollers 34, 35 and 37, 38, respectively, through openings 41 and 42, respectively, in the guide nozzle 39 toward the covering 32 in oblique direction so that the steel wires will press together the rows 28 and 29 until the shaped pieces fuse down in the arc 40.

Fig. 9 illustrates a device for producing rows of shaped pieces attached to guiding tapes. The piston 43 of the container 44 presses the plastic material 45 through the press-nozzle path 46 at the same speed at which a tape 49, supplied from a coil 47 and pre-stretched by a spring 48 and then entering the nozzle path 46 through lateral openings 50, is moved along that side of the path where the covering pieces shaped by the profile of the path are to adhere to the tape 49. The carrying tape 49 with the shaped plastic material combined as a unit 51 are drawn over the pulling drum 52 and the drying drum 56 and are wound upon the bobbin 57. 53 is a wheel with cutting blades 54 which have the same circumferential speed as the drums 52 and 56 and the bobbin 57 and make incisions 55 into the plastic material to a certain depth and at distances from one another that are identical with the desired length of the shaped pieces. When leaving the drying drum 56, the covering material on the tape 49 has lost its plasticity so that, by winding the tape upon the bobbin 57 in such a position that the tape is inward and the covering material outward, the incisions will break through to the tape-back and will thus separate the endless stick of covering material into rigid shaped coating pieces of the desired length and sticking only to the tape. The tape-guided rows of coating pieces are then supplied to the blank electrode to be assembled therewith in the above-described way to a full coating.

What I claim is:

1. For automatic arc welding with electrodes covered by flux material, an electrode covering comprising ready-shaped rigid pieces of flux material of predetermined short length and of an arcuate cross-section identical with a predetermined part of the symmetrical area representing the cross-section of the complete electrode covering, substantially continuous means for connecting the short lengths of flux together endwise, said connecting means being flexible so as to enable the bands of flux thus produced to bend sharply, and means, feedable with the electrode, for retaining said pieces around the electrode core.

2. For automatic arc welding with electrodes covered by flux material, an electrode covering comprising rows of ready-shaped rigid pieces of flux material of predetermined short length, all pieces of each row having the same arcuate cross-section which is identical with a predetermined part of the symmetrical area representing the cross-section of the complete electrode covering, the said pieces being arranged with the recessed piece-faces toward the same side and forming a continuous groove, substantially continuous means for connecting the short lengths of flux together endwise, said connecting means being flexible so as to enable the bands of flux thus produced to bend sharply, and means, feedable with the electrode, for retaining said rows along the electrode core.

3. For automatic arc welding with electrodes covered by flux material, an electrode covering comprising two rows of ready-shaped rigid pieces of flux material of predetermined short length, all pieces of each row having the same arcuate cross-section which is identical with one half of the symmetrical area representing the cross-section of the complete electrode covering, the said pieces being arranged with the recessed piece-faces toward the same side and forming a continuous groove, substantially continuous means for connecting the short lengths of flux together endwise, said connecting means being flexible so as to enable the bands of flux thus produced to bend sharply, and means, feedable with the electrode, for retaining said rows along the electrode core.

4. For automatic arc welding with electrodes covered by flux material, an electrode covering comprising rows of ready-shaped rigid pieces of flux material of predetermined short length, all pieces of each row having the same arcuate cross-section which is identical with one half of the symmetrical area representing the cross-section of the complete electrode covering, the said pieces being arranged with the recessed piece-faces toward the same side and forming a continuous groove, all pieces of each row being attached to a flexible guiding member common to all pieces of the same row, and means feedable with the electrode for retaining said rows along the electrode core.

5. For automatic arc welding with electrodes covered by flux material, an electrode covering comprising rows of ready-shaped rigid pieces of flux material of predetermined short length, all pieces of each row having the same arcuate cross-section which is identical with one half of the symmetrical area representing the cross-section of the complete electrode covering, the said pieces being arranged with the recessed piece-faces toward the same side and forming a continuous groove, all pieces of each row being attached to a carrying tape common to all pieces of the same row, and means feedable with the electrode for retaining said rows along the electrode core.

6. For automatic arc welding with electrodes covered by flux material, an electrode covering comprising rows of ready-shaped rigid pieces of flux material of predetermined short length, all pieces of each row having the same arcuate cross-section which is identical with one half of the symmetrical area representing the cross-section of the complete electrode covering, the said pieces being arranged with the recessed piece-faces toward the same side and forming a continuous groove, all pieces of each row being attached to a carrying wire common to all pieces of the same row, and means feedable with the electrode for retaining said rows along the electrode core.

7. For automatic arc welding with electrodes covered by flux material, an electrode covering comprising rows of ready-shaped rigid pieces of flux material of predetermined short length, all pieces of each row having the same arcuate cross-section which is identical with one half of the symmetrical area representing the cross-section of the complete electrode covering, the said pieces being arranged with the recessed piece-faces toward the same side and forming a continuous groove, all pieces of each row being attached to one another by a flexible wire system traversing the pieces lengthwise near the side opposite the recessed side and common to all pieces of the same row, and means feedable with the electrode for retaining said rows along the electrode core.

8. For automatic arc welding with electrodes covered by flux material, an electrode covering comprising two rows of ready-shaped rigid pieces of flux material of predetermined short-length, all pieces of each row having the same arcuate cross-section, which is identical with one half of the symmetrical area representing the cross-section of the complete electrode covering, the said pieces being arranged with the recessed piece-faces toward the same side and forming a continuous groove, all pieces of each row being attached to a flexible guiding member common to all pieces of the same row, the rows being sharply bent from opposite sides so as to lie lengthwise on the electrode core at the point of contact of said core with the respective row and being feedable towards the arc so that they may progressively be joined to a complete covering and attached to the said core at a small distance from the arc and means, feedable with the electrode, for retaining the strips of flux in position around the core.

9. For automatic arc welding with electrodes covered by flux material, an electrode covering comprising two rows of ready-shaped rigid pieces of flux material of predetermined short length, all pieces of each row having the same arcuate cross-section, which is identical with one half of the symmetrical area representing the cross-section of the complete electrode covering, the said pieces being arranged with the recessed piece-faces toward the same side and forming a continuous groove, all pieces of each row being attached to a flexible guiding member, common to all pieces of the same row, the rows being sharply bent from opposite sides so as to lie lengthwise on the electrode core at the point of contact of said core with the respective row and being feedable towards the arc, and means, feedable with the electrode, for connecting the rows of flux together to form a complete covering a short distance from the arc.

10. For automatic arc welding with electrodes covered by flux material, an electrode covering comprising two rows of ready-shaped rigid pieces of flux material of predetermined short length, all pieces of each row having the same arcuate cross-section, which is identical with one half of the symmetrical area representing the cross-section of the complete electrode covering, the said pieces being arranged with the recessed piece-faces toward the same side and forming a continuous groove, all pieces of each row being attached to a flexible guiding member, common to all pieces of the same row, the rows being sharply bent from opposite sides so as to lie lengthwise on the electrodes core at the point of contact of said core with the respective row and being feedable towards the arc, means for attaching the rows of flux pieces to one another at a small distance from the arc to form a complete covering for the core, the hollow space inside the electrode covering being larger than the electrode core, said core being slidably located within the covering.

11. For automatic arc welding with electrodes covered by flux material, an electrode covering comprising two rows of ready-shaped rigid pieces of flux material of predetermined short length, all pieces of each row having the same arcuate cross-section, which is identical with one half of the symmetrical area representing the cross-section of the complete electrode covering, the said pieces being arranged with the recessed piece-faces toward the same side and forming a continuous groove, all pieces of each row being attached to a flexible guiding member common to all pieces of the same row, the rows being sharply bent from opposite sides so as to lie lengthwise on the electrode core at the point of contact of said core with the respective row and being feedable towards the arc, means for joining said rows of flux pieces together to form a complete covering of the core, said means comprising spring wires bent in substantially the same manner as the rows and lying on the outside of said rows to exert sufficient pressure in assembling direction.

12. For automatic arc welding with electrodes covered by flux material, ready-shaped rigid pieces of flux material of predetermined short length and of arcuate cross-section identical with a predetermined part of the symmetrical area representing the cross-section of the complete electrode covering, substantially continuous means for connecting the short lengths of flux together endwise, said connecting means being flexible so as to enable the bands of flux thus produced to bend sharply.

13. For automatic arc welding with electrodes covered by flux material, ready-shaped rigid pieces of flux material of predetermined short length and of arcuate cross-section identical with a predetermined part of the symmetrical area representing the cross-section of the complete electrode covering, said pieces being arranged in rows, with the recesses forming a continuous groove and being held together by a flexible carrying member common to all pieces of the same row.

WILLIBALD SENFT.

REFERENCES CITED

The following references are of record in the file of this patent:

UNITED STATES PATENTS

| Number | Name | Date |
|---|---|---|
| 802,159 | Dykes | Oct. 17, 1905 |
| 815,571 | Williams | Mar. 20, 1906 |
| 1,356,468 | Peters et al. | Oct. 19, 1920 |
| 2,093,394 | Emery | Sept. 14, 1937 |
| 2,107,434 | Wilson | Feb. 8, 1938 |
| 2,121,693 | Henderson | June 21, 1938 |
| 2,149,490 | Allord | Mar. 7, 1939 |
| 2,149,491 | Allord | Mar. 7, 1939 |